Oct. 5, 1926.

G. G. SMITH 1,602,052

SEWAGE DISPOSAL PLANT

Filed Jan. 10, 1925    3 Sheets-Sheet 1

INVENTOR

George G. Smith

BY

H. S. Bailey. ATTORNEY

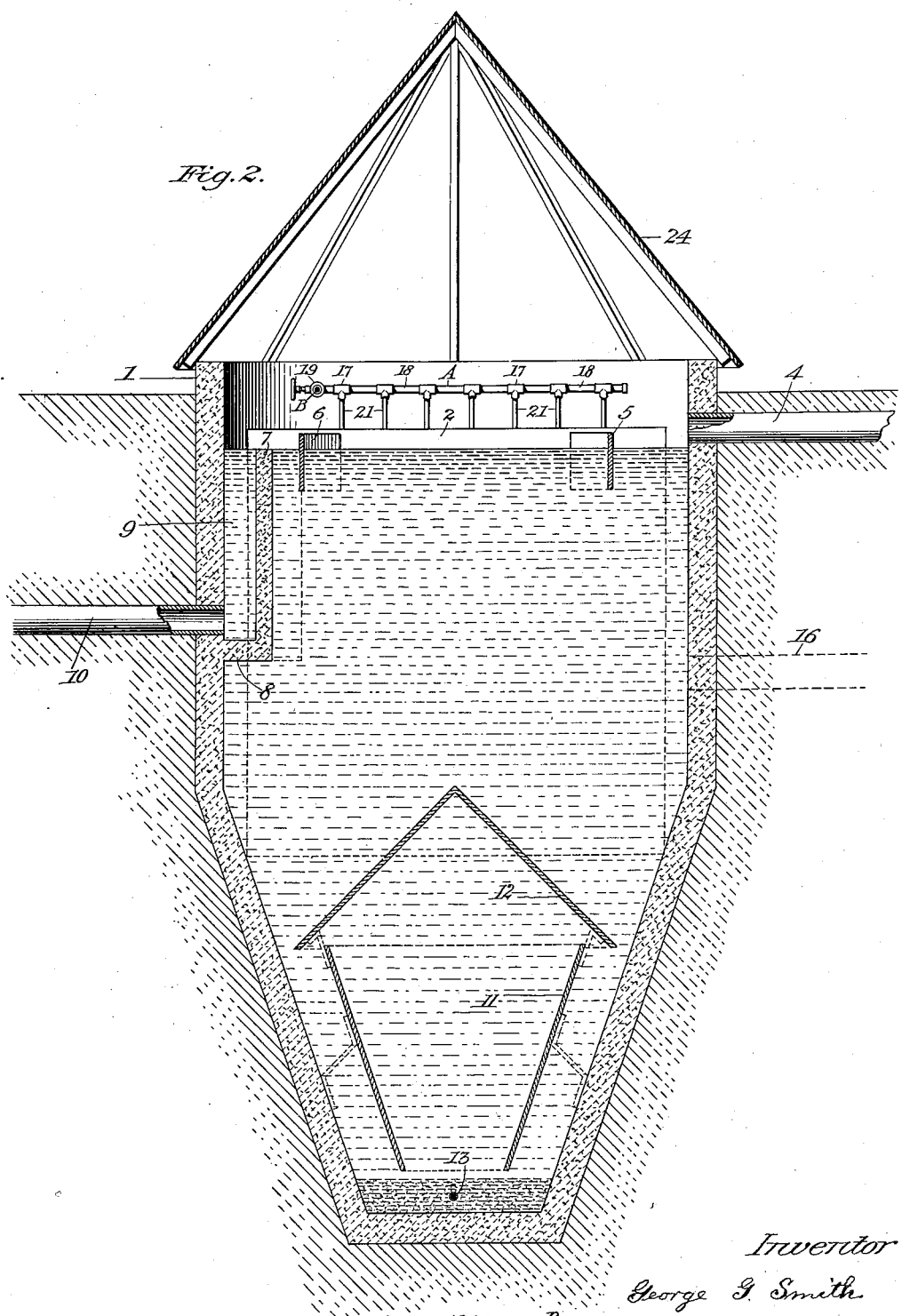

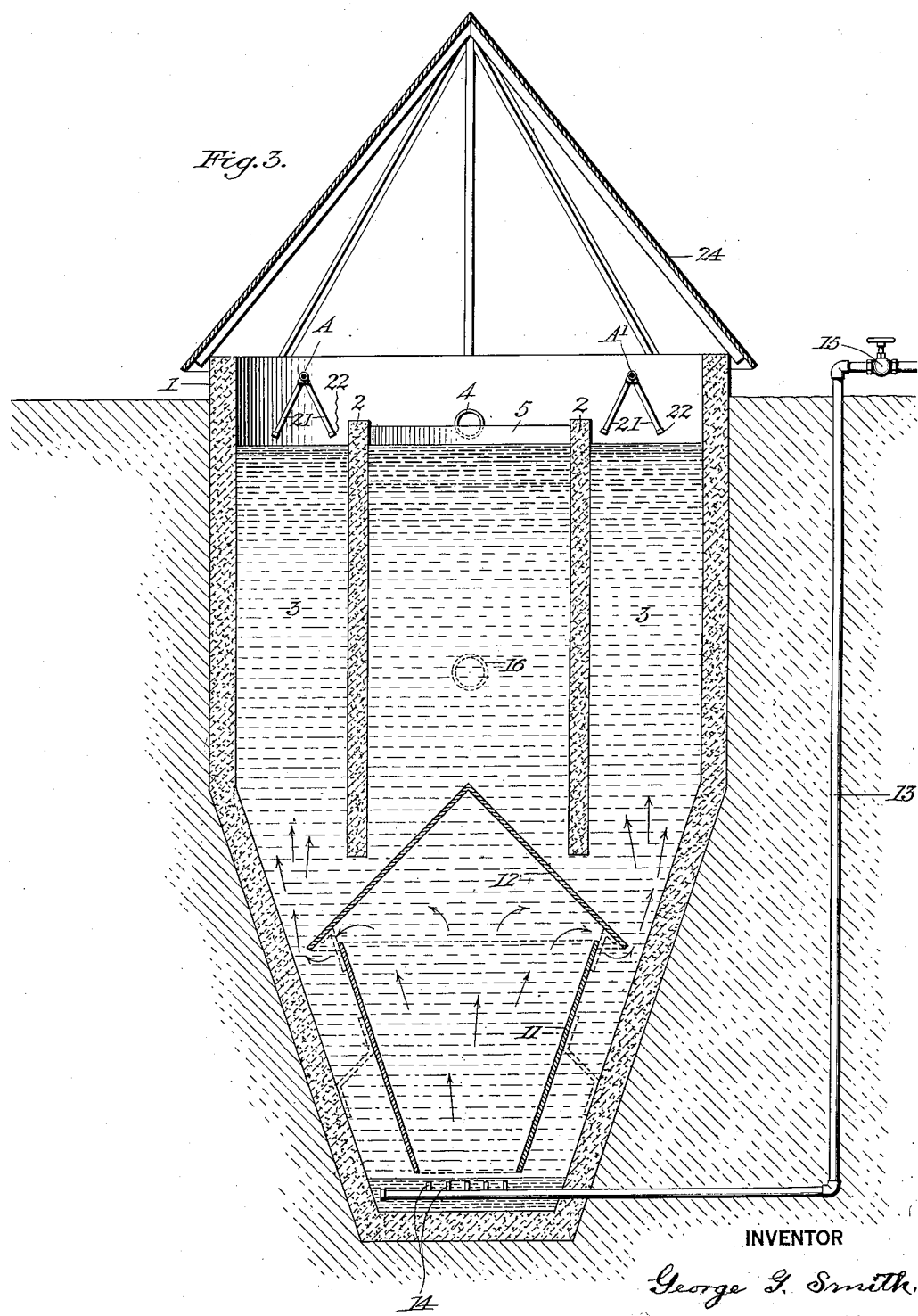

Patented Oct. 5, 1926.

1,602,052

UNITED STATES PATENT OFFICE.

GEORGE G. SMITH, OF LITTLETON, COLORADO.

SEWAGE-DISPOSAL PLANT.

Application filed January 10, 1925. Serial No. 1,711.

This invention relates to improvements in sewage disposal plants.

The main object of the invention is to provide means for settling the scud which would otherwise collect on the surface of the water in the gas chambers of sewer tanks, thus permitting the gas as it rises to continuously pass off into the atmosphere practically free from offensive odor.

Further to provide in connection with the gas chambers of sewer tanks, pipes having spraying nozzles whereby water under pressure can be continuously sprayed upon the surface of the said gas beds to prevent any accumulation of scud or scum thereon, or the water may be sprayed at intervals to settle any slight accumulation, thus preventing the gas from being trapped by the said scud, which otherwise would collect on the surface of the gas bed, preventing the escape of the gas which thus confined, takes on a very offensive odor.

These objects are accomplished by the mechanism illustrated in the accompanying drawings in which:

Figure 2 is a vertical sectional view thereof on the line 2—2 of Figure 1.

Figure 3 is a similar view on the line 3—3 of Figure 1; and

Figure 1:
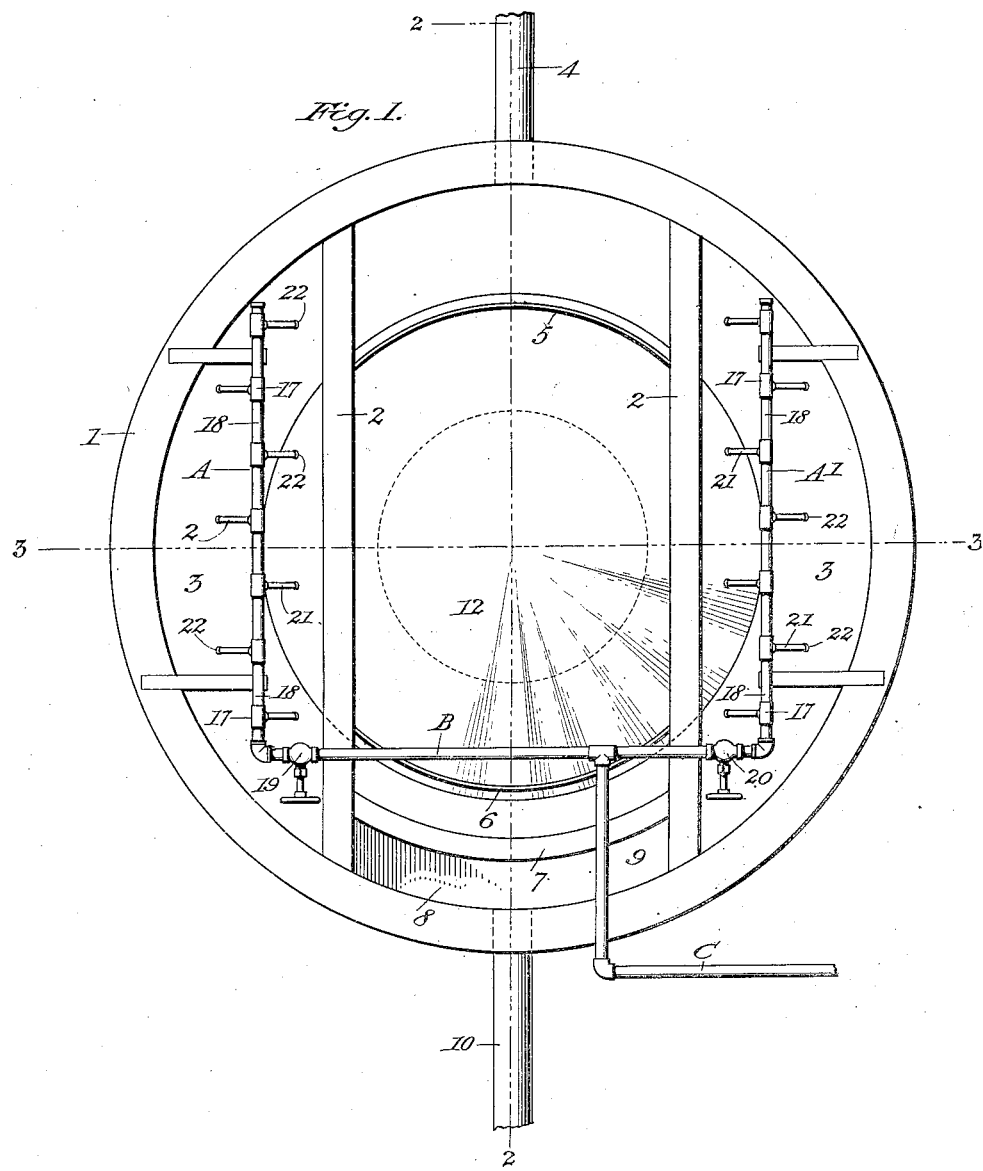
Figure 1 is a plan view of a sanitary sewer tank equipped with the improved scud-settling mechanism.

In sanitary sewer tanks of the type shown in the accompanying drawings, the sewage flows continuously into the tank through an inlet pipe and the water rises to a level defined by a weir or dam over which it flows and passes off through an outlet pipe to a suitable filtering plant and thence to a stream or river.

The solid matter in the sewage settles at the bottom of the tank, and gases are thereby formed which pass up through the water in gas chambers on opposite sides of the tank, carrying with them bacteria which accumulate on the surface of the water therein in the form of a tough scum of continuously increasing thickness which traps or confines the gas, thereby causing the same to take on a very offensive odor; and such gas, when liberated, not only pollutes the atmosphere but is positively detrimental to health. Such methods as are at present employed for preventing the accumulation of this scum on the surface of the water in the gas chambers are ineffectual for the reason that the scum is not settled but only perforated or disintegrated, and the gas passing through this mass is highly tainted. The present invention practically eliminates this unsanitary and unpleasant condition by providing means for settling the scum, thus permitting the gas to pass off into the atmosphere before becoming contaminated, as will hereinafter be fully set forth.

Referring to the accompanying drawings:

The numeral 1 designates a septic sanitary sewer tank of a style in common use which embodies in its construction the improved means for settling the scud or scum which rises to the surface of the water in the gas chambers, thus permitting the gas to continuously escape into the atmosphere practically free from offensive odors.

The tank 1 is of suitable depth for the purpose intended and is open at the top. It is preferably of concrete construction and is buried in the ground to within a short distance of its rim. The upper half of this tank is cylindrical in form and its lower half is preferably tapered or conical, and terminates in a flat bottom.

Parallel, vertical partitions 2 extend across the tank and are an integral part of the wall of the tank. These partitions extend from a point below the center of the tank, to within a short distance of its top or rim, and the space between each partition and the adjacent portion of the tank constitutes a gas chamber 3, while the space between the two partitions is that which receives the inflowing sewage from an inlet pipe 4. A vertically disposed baffle plate 5 extends across the space between the partitions 2 and is secured at its ends in the said partitions. This baffle plate is located a suitable distance from the side of the tank having the inlet pipe 4 and has a curvature concentric with that of the tank. It extends a short distance above the water level of the tank and a slightly greater distance below the said water level. The sewage entering the tank flows against this baffle plate which stops its horizontal movement, and causes it to descend vertically to the bottom of the tank, as will be understood by reference to Figure 2.

A similar baffle plate 6 extends between the two partitions on the opposite side of the tank from the baffle plate 5, and this baffle plate prevents grease which rises to the surface of the water from passing to the outlet. Between the plate 6, and the adjacent wall of the tank is located a vertical weir or dam 7. This weir is approximately half the height of the partitions 2 and terminates at its upper end a short distance below the upper ends of the partitions, as clearly shown in Figure 2. The ends of this weir are integrally connected with the partitions 2, and a bottom portion 8 connects it with the wall of the tank, and the space between the weir and the tank wall constitutes an overflow chamber 9, from the bottom portion of which an outlet pipe 10 extends through the wall of the tank, and connects with a suitable filtration plant not shown.

A metal funnel-shaped member 11 is supported in the lower portion of the tank, its lower end being a short distance above the bottom of the tank, and a conical hood 12 of greater diameter than the upper end of the funnel 11, is supported above the said funnel so that the upper end of the funnel lies slightly within the conical hood, as shown. A pipe 13 extends down through the ground adjacent the tank and enters the lower end of the tank below the lower end of the funnel, and this portion of the pipe is provided with spray nozzles 14, which are positioned to direct jets of water up through the funnel when desired for a purpose to be presently explained, and the pipe 13 is provided with a cut-off valve 15.

An outlet flush pipe 16 extends from about the center of the tank, and this pipe is normally closed by a suitable valve—not shown—but which is opened when it becomes necessary to flush the tank. Then, the valve 15 of the pipe 13 is opened, and jets of water from the nozzles 14 are directed into the funnel 11, whereby the heavy or solid matter which has accumulated in the bottom of the tank is dislodged and broken up and discharges through the pipe 16.

The tank thus far described, is of a style in use at the present time, and in operation the sewage enters the tank through the pipe 4 and fills the same to the level defined by the upper edge of the weir 7, over which it flows into the chamber 9 and thence out through the pipe 10. The heavy or solid matter in the sewage settles to the bottom of the tank and becomes decomposed, thereby generating gas. The gas thus formed passes up through the funnel and into the hood, and then out under the rim of the hood and up behind the partitions 2 into the gas chambers 3. The gas carries with it bacteria from the bottom of the tank, which accumulate on the surface of the water in the gas chambers, forming a scum or scud, as it is commonly called. This scud continuously increases in thickness, and traps the ascending gas which must either force its way through the scud, or the scud must be disintegrated or settled to permit the escape of the gas to the atmosphere, as the trapped or confined gas gives off a very offensive odor when liberated, and is also detrimental to health.

In present practice, no means of settling the scud are employed, but mechanical means have been devised for breaking it up or disintegrating it; though the usual way of overcoming this difficulty is by punching holes in the scud, with a stick or rod.

The present invention, however, entirely eliminates the accumulation of scud, thus permitting the continuous escape of gas to the atmosphere, the gas being practically free from offensive odor. The improved scud-preventing device is constructed and arranged as follows:

At a suitable distance above the water level of the gas chambers 3 are supported, in any suitable way, pipes A and $A^1$, which are made up of T couplings 17 connected by short sections of pipe 18. The pipes A and $A^1$ are connected at one end by a pipe B having cut-off valves 19 and 20, and a supply pipe C connects the pipe B with a source of water under pressure. The valve 19 controls the supply of water to the pipe A, and the valve 20 controls the supply of water to the pipe $A^1$. The T couplings 17 are provided with downwardly extending pipes 21 which extend to within a few inches of the water level of the gas chambers 3, and the pipes 21 of each set are inclined to the right and left in alternate order.

Figure 4:
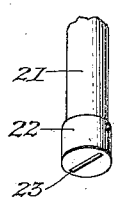
Figure 4 is a perspective view enlarged of a portion of one of the spray pipes and its nozzle.

The lower ends of the pipes 21 are provided with caps or nozzles 22 having outlet slots 23—see Figure 4—which are adapted to discharge water in wide jets or sprays against the surface of the water in the gas chambers.

By continuously spraying the surface of the water in the gas chambers, the formation of scud is not only prevented, but the bacteria are driven to the bottom of the tank where they settle, and the gas is thus permitted to pass out into the atmosphere in a practically non-offensive condition. By properly regulating the valves 19 and 20, only the necessary amount of water to settle the scud is discharged through the nozzles 22, thus eliminating waste; or if desired the water may only be discharged at intervals. The tank may be flushed when necessary in the manner above described.

The tank is covered by a conical roof or cover 24, a space being provided between the edge or rim of said cover and the rim of the tank, to permit the escape of gas.

Having described my invention, what I claim as new and desire to secure by Letters Patent, is:

1. In apparatus for treating sewage, a tank, a vertical partition wall dividing the tank into a main compartment and a secondary compartment, the partition wall extending downwardly from near the top of the tank and terminating a substantial distance from the bottom thereof, a sewage intake opening into the main compartment adjacent the top of the tank, an outlet connected with the main compartment at a point below the level of the intake, a partition the upper edge of which lies below the upper edge of said partition wall, providing an overflow from the main compartment and the sole communication between the inlet and the outlet, a diaphragm below the lower edge of the partition wall extending transversely across the tank and providing a marginal space for permitting gas evolved at the bottom of the tank to pass upwardly into the secondary compartment, and means for discharging liquid under pressure upon the surface of the liquid in the secondary compartment.

2. Apparatus according to claim 1, wherein the diaphragm has the form of a hood.

3. Apparatus according to claim 1, wherein the partition providing the overflow edge is disposed close to the outlet and defines with the wall of the tank an outlet chamber small in comparison to the remaining part of the main compartment.

4. Apparatus according to claim 1, including baffles extending above and below the level of said overflow edge in the main compartment transversely of the direction of flow from the intake to the outlet.

5. In apparatus for treating sewage, a tank, two partition walls dividing the tank into a main compartment and two secondary compartments laterally on opposite sides thereof, the partition walls extending downwardly from near the top of the tank and terminating a substantial distance from the bottom thereof, a sewage intake connected with the main compartment adjacent the top of the tank, an outlet connected with the main compartment opposite the intake and at a level below the latter, a partition wall the upper edge of which lies below the upper edge of said partition walls, providing an overflow from the main compartment and the sole communication between the inlet and the outlet, a diaphragm extending across the tank and providing marginal spaces for permitting gas evolved below the diaphragm to pass upwardly into the secondary compartments, and means discharging liquid under pressure upon the surface of the liquid in the secondary compartments.

6. Apparatus according to claim 5, wherein the diaphragm has the form of a hood, the lower edges of which extend laterally of the planes of the said two partition walls.

7. Apparatus according to claim 5, including a plurality of baffles extending above and below the said overflow edge between said two partition walls, one of said baffles being disposed close to said overflow edge.

8. Apparatus according to claim 5, including a plurality of baffles extending above and below the said overflow edge between said two partition walls, one of said baffles being disposed close to said overflow edge and another close to the intake.

9. Apparatus according to claim 5, including a tubular body below the diaphragm, said body extending from near the bottom of the tank to near the diaphragm and co-operating with the walls of the tank to define a marginal interspace, the space within the body providing a zone of rest.

10. Apparatus according to claim 5, wherein the diaphragm has the form of a hood the lower edges of which extend laterally of the planes of the partition walls, and including a tubular body extending from near the bottom of the tank to near the hood and co-operating with the walls of the tank to define a marginal interspace, the space within the body providing a zone of rest.

In testimony whereof I affix my signature.

GEORGE G. SMITH.